3,387,753
FISH STRINGERS
Scisco Bowman, 6632 14th Ave.,
Kenosha, Wis. 53140
Filed Feb. 23, 1967, Ser No. 617,880
2 Claims. (Cl. 224—7)

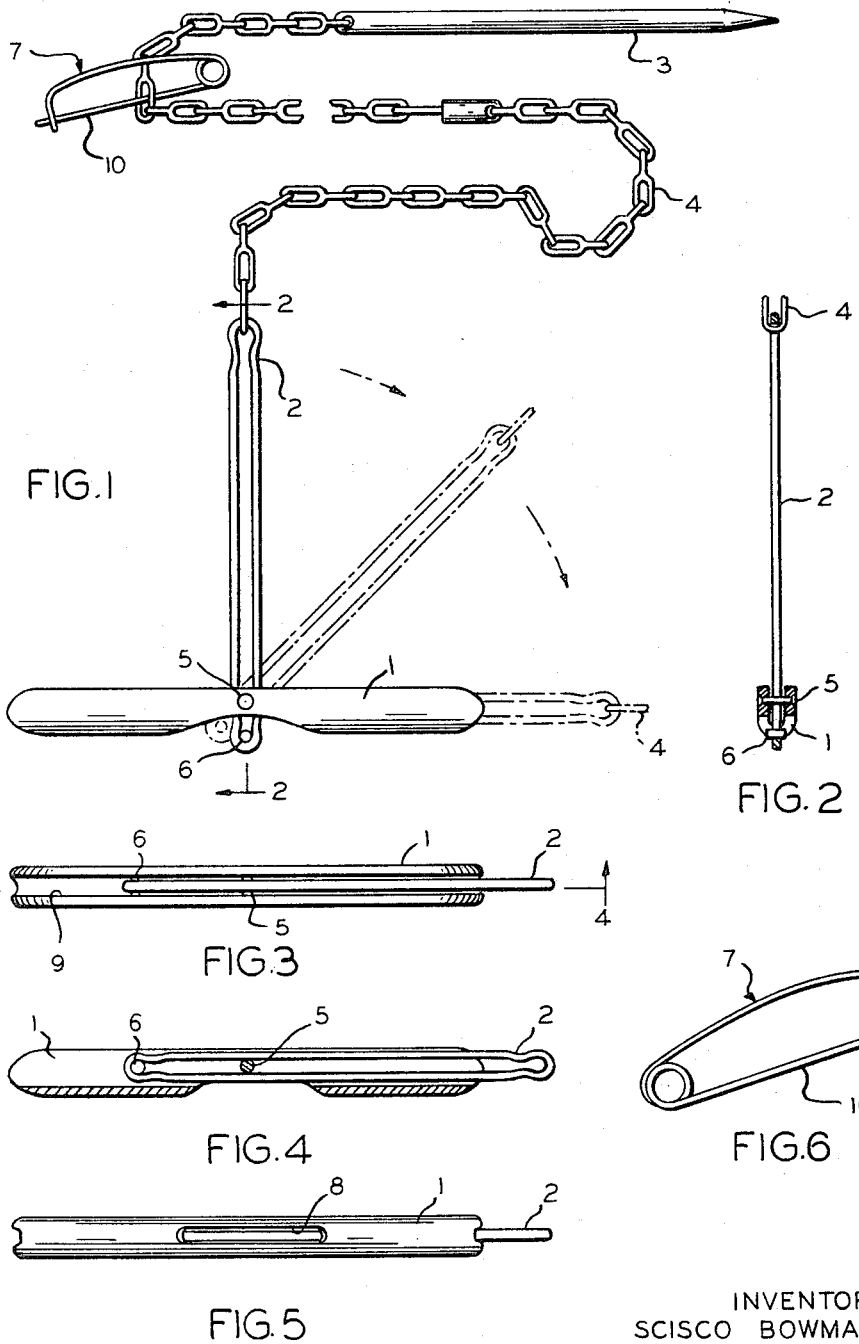

ABSTRACT OF THE DISCLOSURE

An elongated flexible member having a rigid point attached at one end a bar mounted on and extending laterally from the opposite end. The bar consists of two spaced sides between which is pivotally mounted an elongated link for attachment to said flexible member. The bar prevents fish from escaping from the flexible member when the elongated link is pivoted perpendicular to the spaced sides. Removal of fish is accomplished by pivoting the elongated link into longitudinal alignment with the spaced sides and advancing said link longitudinally within said sides.

BACKGROUND OF THE INVENTION

(1) Field of the invention

This invention pertains to general art of securing fish after they have been caught, such that they can be suspended within a convenient body of water without totally restricting their movement.

(2) Description of the prior art

The general arrangement of the elements of fish stringers includes a point or needle for insertion through the fish gill and mouth, a line or chain attached at one end to the needle, onto which the fish can be strung, and a fish retainer secured to the other end of the line or chain to prevent the fish from leaving the line on said latter end. Fish, when left on a fish stringer tend to become fixed to the line or chain through action of jaw and gill becoming clamped onto or tangled within said line or chain and it becomes very difficult to slip the fish over the needle for removal. This difficulty of removing fish led to development of a removable retainer as illustrated by U.S. Patent 1,417,759, which allowed the fish to drop directly off the retainer end of the line or chain. However, the removable retainer was also easily lost, and fish stringers having a retainer permanently affixed were developed. These were designed to align with the line or chain to produce a continuation of said line or chain and thus selectively allow fish to be removed directly from the retainer end. It is the area of the latter fish stringers in which applicant's invention lies, and such invention is designed to solve the joint problem of unpredictability in maintaining alignment between the retainer and the line or chain when the fish are being removed, and inability to expose the full length and width of the retainer to the strung fish when the retainer is in position to retain fish, particularly when a chain rather than a line is used.

SUMMARY OF THE INVENTION

The foregoing background shows that the fish stringer art has not, prior to applicant's invention, solved the dual problems of the permanently affixed retainer which, when functioning to retain fish on a chain, failed to expose the full length and width of the retainer to the fish being retained, and which when in position to release fish was not equipped with means for firmly holding the retainer in place until all fish were removed from the chain. The solution of these problems constitutes the primary object of this invention.

A further object of this invention is to provide a fish stringer with a chain attached, a retainer which can be economically manufactured, and specifically in this regard, a retainer comprised of a single stamping within which a simple link can be pivoted for attachment to the chain.

In the attached drawings and the following description the best mode presently contemplated for carrying out the invention is set forth. The manner and process of making and using the invention is described below in such full, clear, and concise and exact terms as to enable any person skilled in the art to which it pertains, or with which it is most nearly connected, to make and use the invention. It should be emphasized, however, that the subject matter regarded as the invention is not limited solely to the here described embodiment of it, but rather includes everything falling within the claims set forth at the conclusion of this specification.

FIGURE 1 is a plan view of the invention showing the retainer means in open or right angle position in full lines and in two positions assumed during closing to longitudinal alignment with the chain, in dotted lines.

FIGURE 2 is a cross section of the retainer means taken along the lines 2—2 of FIGURE 1.

FIGURE 3 is a top view of the retainer means in closed position such that principal parts align longitudinally with the chain of the stringer.

FIGURE 4 is a cross section of the retainer means taken along the lines 4—4 of FIGURE 3.

FIGURE 5 is a bottom view of the retainer means in closed position such that its principal parts align longitudinally with the chain of the stringer.

FIGURE 6 is a plan view of the clamp removed from the stringer chain.

Referring now to the drawings in detail, retainer case 1 has a groove 9 running longitudinally along its top which groove connects with opening 8 in the bottom of such retainer case.

Elongated link 2 is slideably mounted within groove 8 and is limited as to movement with respect to retainer case 1 by pin 5 through said case 1 and link 2.

Rivet 6 is rigidly fixed within the end of link 2 and fits against the sides of groove 9 when link 2 is in longitudinal alignment with case 1 such that friction between said rivet 6 and groove 9 retains link 2 and case 1 in alignment.

Chain 4 is fastened at one end to link 2 and at its other end to needle 3. Clamp 7 is shown with arm 10 inserted through a link of chain 4.

In order to string fish onto chain 4 clamp pin 7 is removed from chain 4, and elongated link 2 is slid longitudinally in retainer case 1 until pin 5 bears on the end of link 2. Said link 2 is then pivoted out of groove 9 until perpendicular with said retainer case 1. Fish can then be threaded onto chain 4 by insertion of needle 3 through mouth and gill after which the fish will come to rest on retainer case 1.

Removal of the fish is accomplished by backing the fish away from retainer case 1, pivoting elongated link 2 into longitudinal alignment with said case 1 and locking said link in place by sliding the link into groove 9 such that friction between rivet 6 and the sides of groove 9 will hold link 2 in retainer case 1.

It will be observed from the foregoing description that this fish stringer is readily adaptable for manufacture with varying retainer means sizes and configurations having a pair of parallel members joined to form a channel having a U-shaped cross section.

While I have illustrated a preferred embodiment of the invention, many modifications may be made without departing from its spirit.

Accordingly, I do not wish to be limited to the precise details of construction set forth, but desire to avail myself of all embodiments as are reasonably covered by the appended claims.

Having thus described my invention, what I claim as new and desire to secure by Letters Patent of the United States, is:

1. In a fish stringer comprising the combination of an elongated flexible member equipped with clamp means for encircling and locking to a convenient object to which said fish stringer is to be attached
   a rigid point mounted at one end of said member;
   a retainer consisting of a pair of spaced sides in the form of plates joined in U-shaped cross section;
   a link suspended on the end of said flexible member opposite from said point, selectively, in perpendicular relationship with said retainer when the link is removed a maximum distance therefrom and in securely held longitudinal alignment within said retainer when said link is inserted a maximum distance therein, said link being pivotally attached between the spaced sides of said retainer for bearing, longitudinal movement with respect thereto;
   and a pin on which said link is pivoted laterally projecting into said spaced sides.

2. In a fish stringer comprising the combination of an elongated flexible member;
   a rigid point mounted at one end of said member;
   a retainer consisting of a pair of spaced sides in the form of plates joined in U-shaped cross section;
   a link suspended on the end of said flexible member opposite from said point, selectively, in perpendicular relationship with said retainer when the link is removed a maximum distance therefrom and in securely held longitudinal alignment within said retainer when said link is inserted a maximum distance therein, said link being pivotally attached between the spaced sides of said retainer for bearing, longitudinal movement with respect thereto;
   and a pin on which said link is pivoted laterally projecting into said spaced sides.

References Cited
UNITED STATES PATENTS

| | | | |
|---|---|---|---|
| 2,473,348 | 6/1949 | Sharps | 224—7 |
| 2,734,671 | 2/1956 | Adams | 224—7 |

HUGO O. SCHULZ, *Primary Examiner.*